US012581179B2

(12) United States Patent
Son et al.

(10) Patent No.: US 12,581,179 B2
(45) Date of Patent: Mar. 17, 2026

(54) CAMERA MODULE AND VEHICLE COMPRISING SAME

(71) Applicant: LG INNOTEK CO., LTD., Seoul (KR)

(72) Inventors: Chang Gyun Son, Seoul (KR); Se Yeon Choi, Seoul (KR); Sung Jin Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 76 days.

(21) Appl. No.: 18/721,009

(22) PCT Filed: Dec. 15, 2022

(86) PCT No.: PCT/KR2022/020450
§ 371 (c)(1),
(2) Date: Jun. 17, 2024

(87) PCT Pub. No.: WO2023/113495

PCT Pub. Date: Jun. 22, 2023

(65) Prior Publication Data

US 2025/0071405 A1     Feb. 27, 2025

(30) Foreign Application Priority Data

Dec. 15, 2021     (KR) ......................... 10-2021-0180134

(51) Int. Cl.
*H04N 23/57*          (2023.01)
*H04N 23/51*          (2023.01)
(Continued)

(52) U.S. Cl.
CPC ............. *H04N 23/57* (2023.01); *H04N 23/51* (2023.01); *H04N 23/54* (2023.01); *H04N 23/55* (2023.01)

(58) Field of Classification Search
None
See application file for complete search history.

(56) References Cited

U.S. PATENT DOCUMENTS 10,514,523 B2 * 12/2019 Lai ......................... G02B 13/06
10,766,431 B2     9/2020 Koshiba et al.
(Continued)

FOREIGN PATENT DOCUMENTS

JP          2016218139 A  * 12/2016
JP          2019-164353 A      9/2019
(Continued)

OTHER PUBLICATIONS

International Search Report dated Mar. 17, 2023 in International Application No. PCT/KR2022/020450.

*Primary Examiner* — Twyler L Haskins
*Assistant Examiner* — Wesley J Chiu
(74) *Attorney, Agent, or Firm* — Saliwanchik, Lloyd & Eisenschenk

(57)          ABSTRACT

A camera module disclosed in the embodiment of the invention includes a substrate; an image sensor disposed on the substrate; a lens assembly disposed on the image sensor and including a barrel portion having a plurality of lenses in a through hole; an optical filter disposed between the image sensor and a last lens; a housing disposed between an upper surface of the substrate and an outer circumference of the lens assembly; and an adhesive member that adheres the housing to the outer circumference of the lens assembly, wherein a package having the image sensor, the lens assembly, the housing, and the adhesive member have different thermal expansion coefficients from each other, an optical axis distance between a lens closest to the image sensor among the lenses with the lens assembly and the image sensor is BFL (Back focusing length), and a height from a lower surface of the lens assembly to an upper surface of the adhesive member may be greater than the BFL and 3 mm or less.

20 Claims, 9 Drawing Sheets

(51) Int. Cl.
    *H04N 23/54*       (2023.01)
    *H04N 23/55*       (2023.01)

(56)             References Cited

U.S. PATENT DOCUMENTS

| | | | | |
|---|---|---|---|---|
| 11,585,963 | B2 | 2/2023 | Aschwanden | |
| 2006/0290802 | A1* | 12/2006 | Webster | H04N 23/55 |
| | | | | 348/340 |
| 2016/0097912 | A1* | 4/2016 | Kobori | G02B 7/028 |
| | | | | 359/820 |
| 2019/0196134 | A1* | 6/2019 | Yuan | G02B 7/022 |
| 2020/0310227 | A1* | 10/2020 | Hubert | G03B 17/08 |
| 2021/0072509 | A1 | 3/2021 | Chae et al. | |
| 2021/0274077 | A1* | 9/2021 | Polak | H04N 23/55 |
| 2022/0004085 | A1 | 1/2022 | Shabtay et al. | |
| 2022/0099913 | A1* | 3/2022 | Blake, III | G03B 17/12 |

FOREIGN PATENT DOCUMENTS

| | | | |
|---|---|---|---|
| JP | 2020-166270 | A | 10/2020 |
| JP | 2021-144085 | A | 9/2021 |
| KR | 10-2019-0059896 | A | 5/2019 |
| KR | 10-2020-0129352 | A | 11/2020 |
| KR | 10-2021-0030007 | A | 3/2021 |
| KR | 10-2021-0054582 | A | 5/2021 |
| KR | 10-2021-0088096 | A | 7/2021 |

* cited by examiner

CAMERA MODULE AND VEHICLE COMPRISING SAME

CROSS-REFERENCE TO RELATED APPLICATIONS

This application is the U.S. national stage application of International Patent Application No. PCT/KR2022/020450, filed Dec. 15, 2022, which claims the benefit under 35 U.S.C. § 119 of Korean Application No. 10-2021-0180134, filed Dec. 15, 2021, the disclosures of each of which are incorporated herein by reference in their entirety.

TECHNICAL FIELD

An embodiment of the invention relates to a camera module and a vehicle having the same.

BACKGROUND ART

ADAS (Advanced Driving Assistance System) is an advanced driver assistance system for assisting the driver to drive and is composed of sensing the situation in front, determining the situation based on the sensed result, and controlling the behavior of the vehicle based on the situation determination. For example, the ADAS sensor device detects a vehicle ahead and recognizes a lane. Then, when the target lane or target speed and the target in front are determined, the vehicle's ESC (Electrical Stability Control), EMS (Engine Management System), MDPS (Motor Driven Power Steering), etc. are controlled. Typically, ADAS may be implemented as an automatic parking system, a low-speed city driving assistance system, a blind spot warning system, and the like. The sensor devices for sensing the forward situation in ADAS are a GPS sensor, a laser scanner, a front radar, and a lidar, and the most representative is a front camera for photographing the front of the vehicle. The driver condition monitoring system consists of a near-infrared (NIR) camera and an electronic control unit (ECU). The driver condition monitoring system uses NIR LEDs to project infrared rays onto the driver's face, and acquires the driver's face image onto which the infrared rays are projected. The ECU processes the driver's face image obtained from the NIR camera to detect eyes, nose, and mouth, and checks the direction in which the driver's gaze is directed and whether the eyes are opened or closed. Based on the direction in which the driver's gaze is directed and whether the eyes are opened or closed, the ECU may determine the driver's condition, and accordingly, may determine whether the driver is negligent or not. When the driver's negligence is determined, the ECU warns the driver by outputting a warning signal through an output device such as a buzzer.

The vehicle camera module is used to be built-in front and rear surveillance cameras and black boxes in a vehicle, and a subject is captured as a picture or a video. Since the vehicle camera module is exposed to the outside, the shooting quality may be deteriorated due to moisture and temperature. In particular, the camera module has a problem in that the optical properties change depending on the ambient temperature and the material of the lens. In the process of combining the lens assembly and housing for the production of conventional camera modules, it is often decided by the structure of the camera module, the shape of the lens assembly, the active align method, and the size of the camera, rather than considering structural design or combination for heat compensation. Additionally, the lens assembly has a focal length that provides the best performance, and is assembled based on that focal length, so when the temperature changes, a problem may occur in which the focal length of the lens changes.

DISCLOSURE

Technical Problem

An embodiment of the invention may provide a camera module capable of thermal compensation. An embodiment of the invention may provide a camera module that can keep the optical axis distance between the image sensor and the last lens constant. An embodiment of the invention may provide a mobile device such as a mobile terminal or a vehicle having a camera module.

Technical Solution

A camera module according to an embodiment of the invention includes a substrate; an image sensor disposed on the substrate; a lens assembly disposed on the image sensor and including a barrel portion having a plurality of lenses in a through hole; an optical filter disposed between the image sensor and a last lens; a housing disposed between an upper surface of the substrate and an outer circumference of the lens assembly; and an adhesive member that adheres the housing to the outer circumference of the lens assembly, wherein a package having the image sensor, the lens assembly, the housing, and the adhesive member have different thermal expansion coefficients from each other, an optical axis distance between a lens closest to the image sensor among the lenses with the lens assembly and the image sensor is BFL (Back focusing length), and a height from a lower surface of the lens assembly to an upper surface of the adhesive member may be greater than the BFL and 3 mm or less.

According to an embodiment of the invention, the adhesive member may be made of an epoxy material or a material with a higher thermal expansion coefficient than that of the lens assembly. A thickness of the adhesive member may be in a range of 0.3 mm±5%. The height from the lower surface of the lens assembly to the upper surface of the adhesive member may range from 3 mm to 5 mm. A BFL change amount is in a range of EFL×0.005 mm, and the EFL may be an effective focal length. An allowable range of the BFL may be BFL value±BFL change amount.

According to an embodiment of the invention, when a temperature change between high and low temperatures of the camera module is in a range of 65 degrees based on room temperature, a height of a lens portion where a difference of the temperature change between the BFL at the high temperature and the low temperature is minimum may be 2.4 mm+0.5 mm. A vehicle or moving object according to an embodiment of the invention may include the camera module.

Advantageous Effects

According to an embodiment of the invention, thermal deformation due to material differences between lenses in a camera module or change in focal length depending on temperature can be suppressed through mechanical combination. According to an embodiment of the invention, a reliability of a camera module capable of mechanical heat compensation can be improved. According to an embodiment of the invention, a reliability of the camera module can be improved by providing a camera module that can minimize changes in focal length. According to an embodiment of the invention, an optical reliability of the camera module can be improved. Additionally, the reliability of the camera module and the vehicle camera device having the same can be improved.

DESCRIPTION OF DRAWINGS

FIG. 3 is an example of a side cross-sectional view of a camera module having the lens assembly of FIG. 1.

FIG. 4 is a schematic diagram of a camera module having a heat compensation structure according to an embodiment of the invention.

BEST MODE

Figure 1:
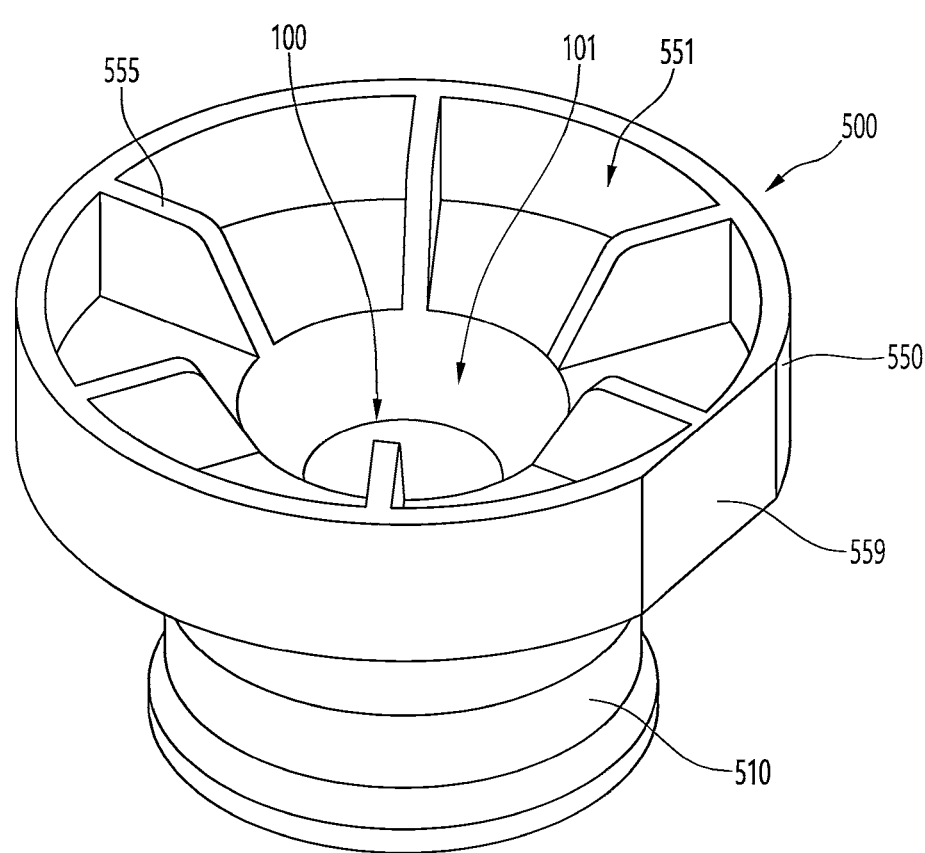
FIG. 1 is a perspective view of a lens assembly according to an embodiment of the invention.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

In addition, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element.

And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element. Several embodiments described below may be combined with each other, unless it is specifically stated that they cannot be combined with each other. In addition, the description of other embodiments may be applied to parts omitted from the description of any one of several embodiments unless otherwise specified.

In the description of the invention, the first lens means the lens closest to the object side among the plurality of lenses aligned with the optical axis, and the last lens means the lens closest to the sensor side among the plurality of lenses aligned with the optical axis. In the description of the invention, all measures for the radius, thickness/distance, TTL, etc. of the lens are mm unless otherwise specified. In the present specification, the shape of the lens is shown based on the optical axis of the lens. For example, that the object-side or sensor-side surface of the lens is convex means that the optical axis vicinity is convex on the object-side or sensor-side surface of the lens, but does not mean that the optical axis periphery is convex. Accordingly, even when the object-side or sensor-side surface of the lens is described as being convex, the portion around the optical axis on the object-side or sensor-side surface of the lens may be concave. That the object-side or sensor-side surface of the lens is concave means that the vicinity of the optical axis is concave on the object-side or sensor-side surface of the lens, but does not mean that the periphery of the optical axis is concave. Accordingly, even when the object-side or sensor-side surface of the lens is described as being concave, the portion around the optical axis on the object-side or sensor-side surface of the lens may be convex. In the present specification, it should be noted that the thickness and radius of curvature of the lens are measured based on the optical axis of the lens. That is, the convex surface of the lens may mean that the lens surface of the region corresponding to the optical axis has a convex shape, and the concave lens surface means that the lens surface of the region corresponding to the optical axis has a concave shape can do. In addition, "object-side surface" may mean a surface of the lens that faces the object side with respect to the optical axis, and "sensor-side surface" may mean a surface of the lens that faces the sensor-side surface with respect to the optical axis.

Figure 2:
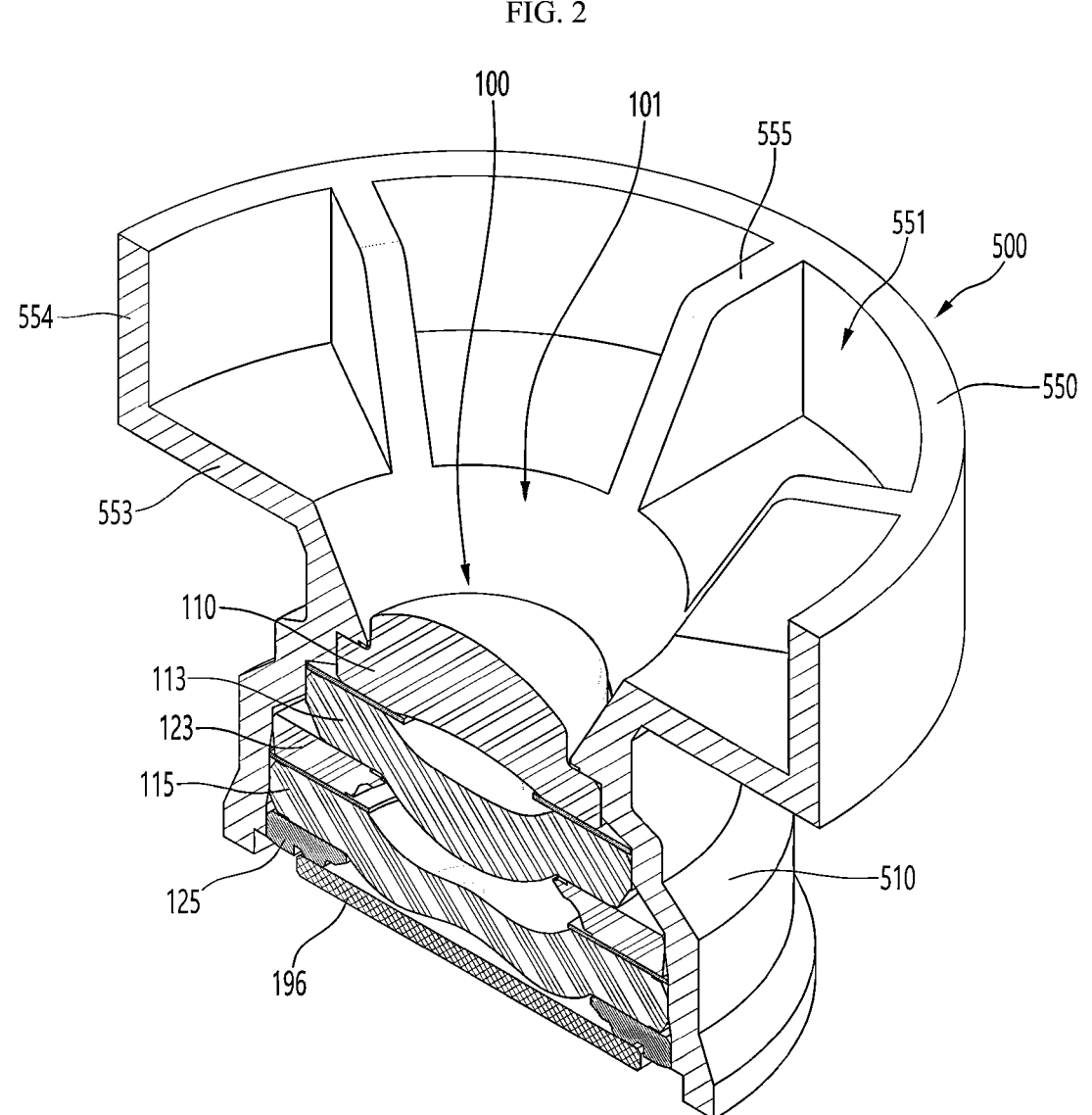
FIG. 2 is a partial side cross-sectional view of the lens assembly of FIG. 1.
Figure 3:
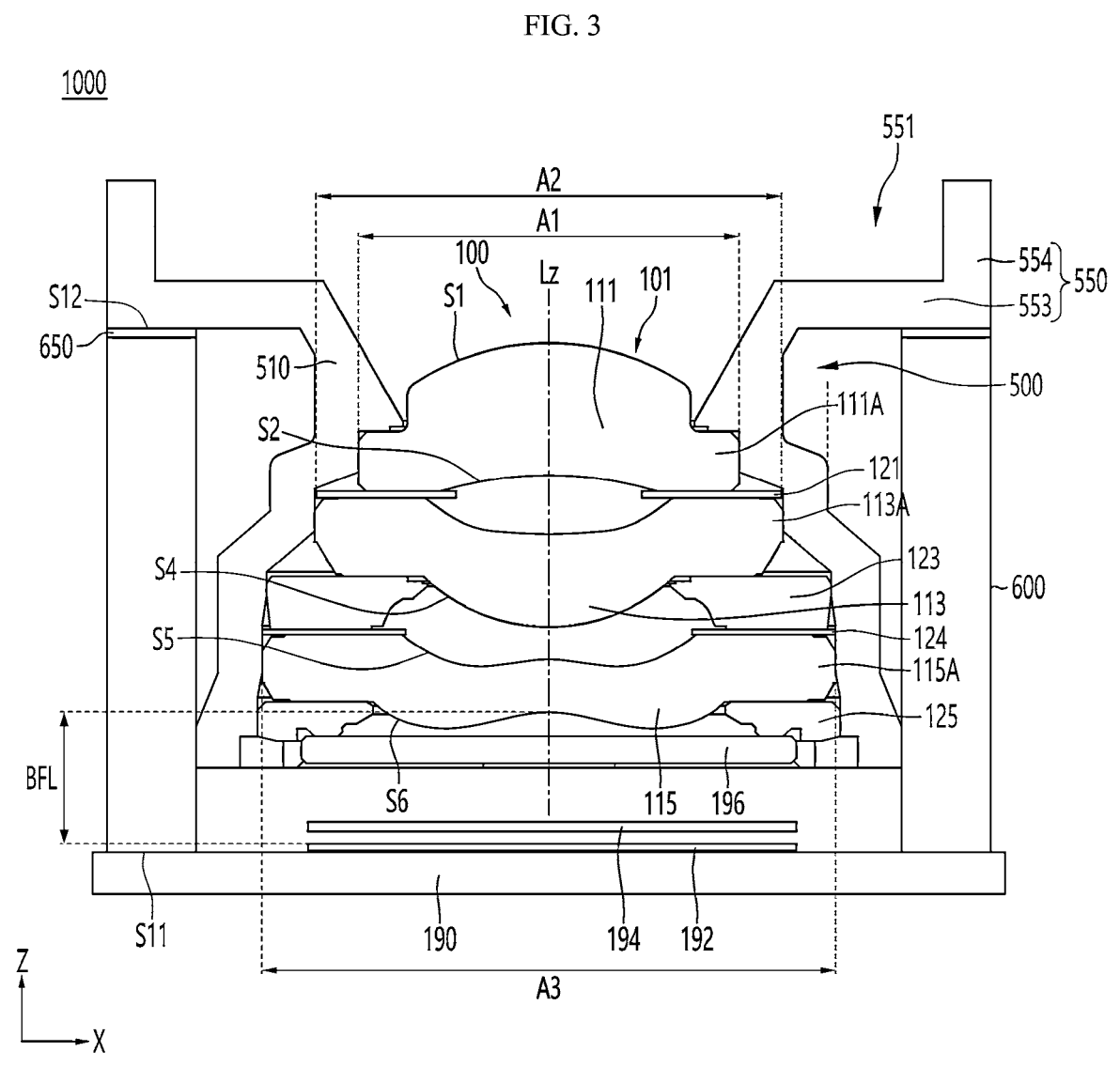
Figure 4:
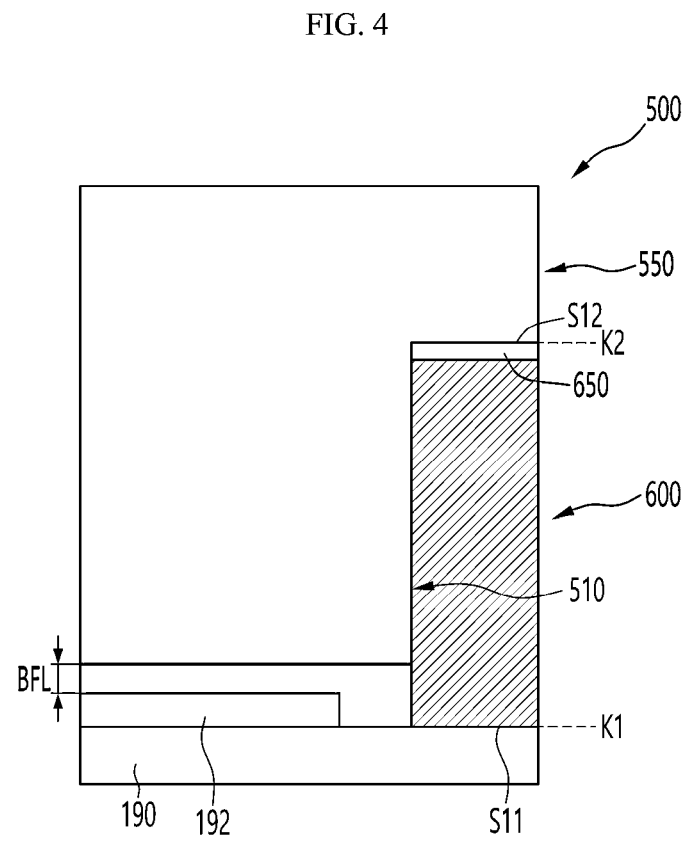
Figure 5A:
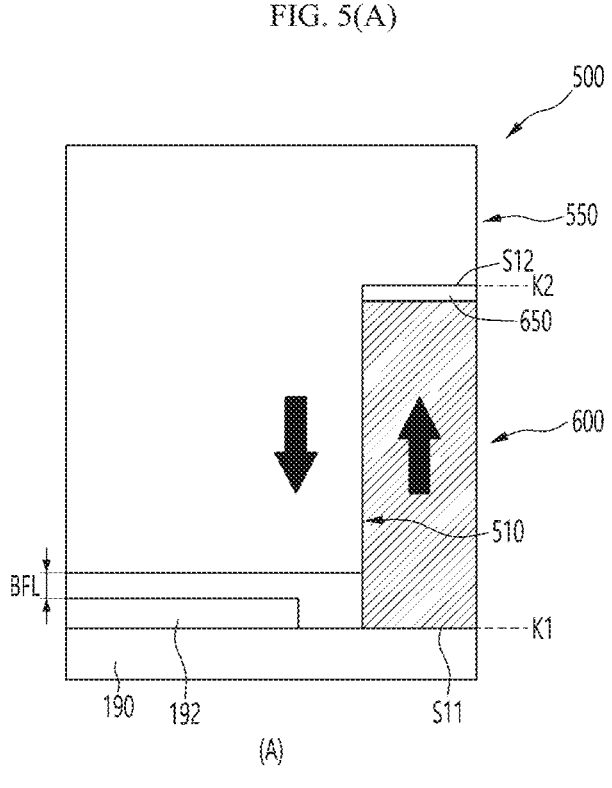
FIGS. 5 (A) and 5 (B) are diagrams illustrating an example of heat compensation according to a temperature increase or decrease of the lens assembly of FIG. 4.
Figure 5B:
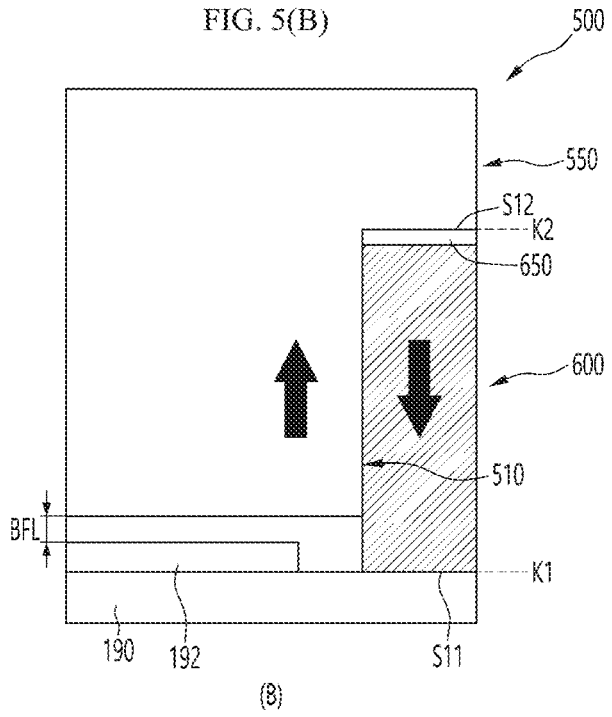
Figure 6:
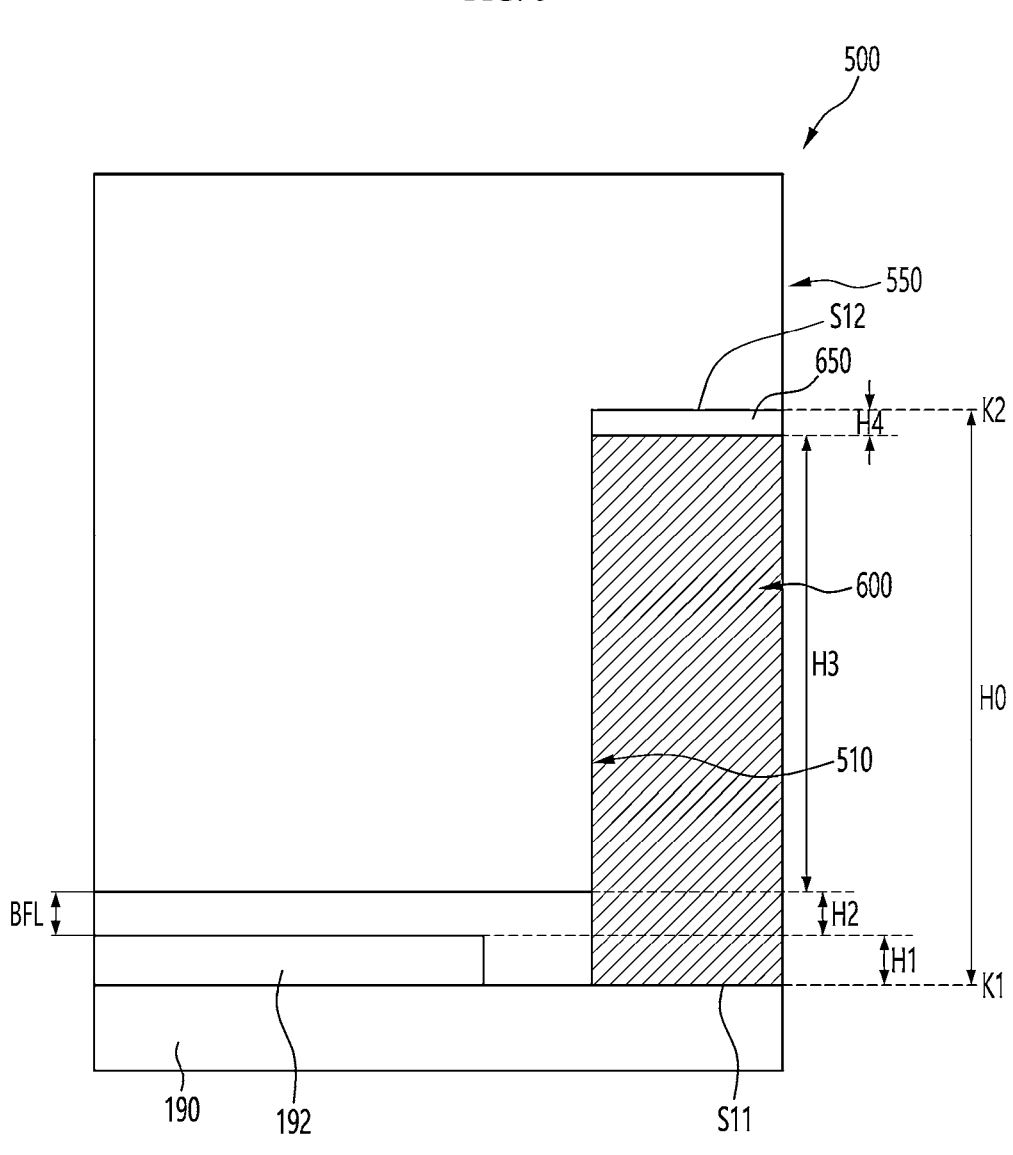
FIG. 6 is a diagram for explaining a camera module having the heat compensation structure of FIG. 4.

FIG. 1 is a perspective view of a lens assembly according to an embodiment of the invention, FIG. 2 is a partial side cross-sectional view of the lens assembly of FIG. 1, FIG. 3 is an example of a side cross-sectional view of a camera module having the lens assembly of FIG. 1, FIG. 4 is a schematic diagram of a camera module having a heat compensation structure according to an embodiment of the invention, FIGS. 5 (A) and 5 (B) are diagrams illustrating an example of heat compensation according to a temperature increase or decrease of the lens assembly of FIG. 4, and FIG. 6 is a diagram for explaining a camera module having the heat compensation structure of FIG. 4.

Referring to FIGS. 1 to 3, a camera module 1000 according to an embodiment of the invention includes a lens assembly 500, a lens portion 100 having a plurality of lenses 111, 113, and 115, gap maintenance members 121, 123, 124, and 125, a substrate 190 and an image sensor 192. The camera module 1000 may include a cover glass 194 and an optical filter 196 between the last lens of the lens portion 100 and the image sensor 192.

The lens portion 100 may be an optical system in which three or more lenses 111, 113, 115, and 117 are stacked. The lens portion 100 may include an optical system in which seven or five or less lenses are stacked. The lens portion 100 may include three or more or five or more solid lenses. The lens portion 100 may include at least one lens made of plastic, or may include at least one lens made of glass and a lens made of plastic. In the lens portion 100 according to an embodiment of the invention, the number of lenses made of plastic may be more than that of the lenses made of glass, or there may be two or more lenses. Here, the lens portion 100 may be laminated with plastic lenses or/and glass lens(s). Here, the plastic material has a CET that is 5 times or more higher than the coefficient of linear thermal expansion (CTE) of the glass material, and the change value of the refractive index as a function of temperature may be 10 times or more higher for the plastic material than for the glass material.

For convenience of explanation, the lens portion 100 may include a first lens 111, a second lens 113, and a third lens 115 stacked from the object side toward the image sensor 192, and aligned along the optical axis Lz. The lenses 111, 113, and 115 of the lens portion 100 are coupled to the through hole 501 in the lens assembly 500, and may be coupled, for example, from the sensor side to the object side, in the opposite direction, or in both directions. An example will be given where the lenses 111, 113, and 115 in the through hole 501 of the lens assembly 500 are coupled from the sensor side to the object side.

As shown in FIG. 3, each of the lenses 111, 113, and 115 may include an effective region having an effective diameter through which light is incident, and a non-effective region outside the effective region. The flange portions 111A, 113A, and 115A of the lenses 111, 113, and 115 may be non-effective regions. The non-effective region may be a region where light is blocked by the light blocking films 121 and 124. The flange portions 111A, 113A, and 115A may extend in an effective region of the lenses 111, 113, and 115 in a direction perpendicular to the optical axis Lz, in a radial direction, or in a circumferential direction.

A first light blocking film 121 may be disposed on the outer circumference between the first lens 111 and the second lens 113, and at least one of a gap maintenance member 123 and a second light blocking film 124 may be disposed on the outer circumference between the second lens 113 and the third lens 115. The first and second light blocking films 121 and 124 may function as members that block light on non-effective regions, and either one may be used as an aperture stop. The gap maintenance member 123 may maintain a gap between the second and third lenses 113 and 115. When the gap maintenance member 123 is not present, the flange portions of the two lenses aligned in the optical axis direction may contact or may be contacted by a light shielding film. At least one or all of the first light blocking film 121, the gap maintenance member 123, and the second light blocking film 124 may function as a spacer. The thickness of the first and second light blocking films 121 and 124 may be thinner than the thickness of the gap maintenance member 123. Here, the aperture stop may be disposed around the second surface S2 of the first lens 111, or may be used as the second surface S2.

A support member 125 may be disposed around a lower portion of the third lens 115, and the support member 125 may support the third lens 115 or maintain a distance from the optical filter 196. Here, the outer portion of the third lens 115 may be bonded to the inner surface 511 of the lens assembly 500 with an adhesive.

A diameter A1 of the first lens 111 may be smaller than a diameter A2 of the second lens 113, and the diameter A2 of the second lens 113 may be smaller than the diameter A3 of the third lens 115. The diameters A1, A2, and A3 of the first, second, and third lenses 111, 113, and 115 may gradually increase from the object side to the sensor side. The external shape of the first, second, and third lenses 111, 113, and 115 stacked may be a pyramid shape or a polygon shape. The first lens 111 is the lens closest to the subject, and at least one or both of the object-side first surface S1 from which light is incident and the sensor-side second surface S2 from which light is emitted may be spherical or aspherical. The first surface S1 of the first lens 111 may be convex, and the sensor-side second surface S2 may be concave. The first lens 111 may be made of glass.

The first lens 111 may include a first flange portion 111A on the outside. A portion of the outer side of the first flange portion 111A may be in contact with the inner surface of the lens assembly 500 for heat dissipation. The thickness of the first flange portion 111A may be a distance between two surfaces of the first flange portion 111A in contact with the optical member among the object side and sensor side regions. The optical member may be an object in which a lens, a lens assembly, a gap maintenance member, an aperture stop, a light blocking member, etc. are disposed inside the lens assembly. The length in contact with the inner surface of the lens assembly 500 is a length from one end on the object side of the outer surface of the first flange portion 111A to the other end on the sensor side.

The first lens 111 may be made of glass, and when the camera module 1000 is exposed to light from inside or outside the vehicle, the first lens 111 may inhibit discoloration due to the plastic material and reduce deformation caused by heat. When the camera module 1000 is disposed in a vehicle, the first lens 111 may be made of glass or plastic. The first lens 111 may have a refractive index of 1.7 or more, 1.8 or more, or in the range of 1.7 to 2.3. When expressed as an absolute value, a radius of curvature of the first surface S1 of the first lens 111 may be smaller than the radius of curvature of the second surface S2, for example, 3.3 mm or less. The center thickness of the first lens 111 may be the thickest among the lenses of the lens portion 100, for example, 1 mm or more. To describe the size of the effective diameter of the first lens 111, the effective diameter of the first surface S1 may be larger than the effective diameter of the second surface S2.

The second lens 113 and the third lens 115 may have different materials and refractive indices from the first lens 111. The second lens 113 may be made of plastic. The second lens 113 is disposed between the first lens 111 and the third lens 115, and may have a second flange portion 113A on the outside. The third lens 115 may be made of plastic. The third lens 115 is disposed between the second lens 113 and the optical filter 196, and may have a third flange portion 115A on the outside. The second lens 113 and the third lens 115 may be injection molded from plastic material.

The second lens 113 includes an object-side third surface S3 and a sensor-side fourth surface S4, and the third surface S3 and the fourth surface S4 may be aspherical. The third surface S3 and the fourth surface S4 of the third lens 113 may have different radii of curvature expressed in absolute values. The third surface S3 may be concave, and the sensor-side fourth surface S4 may be convex. As another example, the second lens 113 has two surfaces with different radii of curvature expressed in absolute values, for example, the third surface S3 is convex and the fourth surface S4 is concave. The third surface S3 may be convex and the fourth surface S4 may have a convex structure, or the third surface S3 may have a concave structure and the fourth surface S4 may have a concave structure.

The second lens 113 may include a second flange portion 113A on the outside. A portion of the outer side of the second flange portion 113A may be in contact with the inner surface 511 of the lens assembly 500 for heat dissipation. The second flange portion 113A extends in a direction X perpendicular to the optical axis Lz from the outside of the effective diameter of the second lens 113, and the thickness of the second flange portion 113A may be a distance between two surfaces of the second flange portion 113A in contact with the optical member among the object side and sensor side regions. The thickness D1 of the second flange portion 113A of the second lens 113 may be a distance a surface of the second flange portion 113A contacting the first gap maintaining member 121 and a surface of the second flange portion 113 contacting the second gap maintaining member 123, for example, the distance may be a distance in a direction parallel to the optical axis.

The refractive index of the second lens 113 may be lower than that of the first lens 111, and may be less than 1.7, for example, in the range of 1.45 to 1.69. The difference in refractive index between the second lens 113 and the first lens 111 may be 0.3 or more. When expressed as an absolute value, the radius of curvature of the concave third surface S3 of the second lens 113 may be larger than the radius of curvature of the convex fourth surface S4, for example, 7 mm or more or in the range of 5.1 mm to 7 mm. The radius of curvature of the fourth surface S4 may be 5 mm or less in absolute value, for example, in the range of 2 mm to 5 mm. The difference between the radius of curvature of the third surface S3 and the fourth surface S4 of the second lens 113 may be 1 mm or more, for example, in the range of 1 mm to 5 mm.

The center thickness of the second lens 113 may be the second thickest among the lenses of the lens portion 100, for example, thinner than the center thickness of the first lens 111 and thicker than the center thickness of the third lens 113. The center distance between the second lens 113 and the first lens 111 may be smaller than the thickness of the first lens 111 and may be larger than the center distance between the second and third lenses 113 and 115. To describe the size of the effective diameter of the second lens 113, the effective diameter of the third surface S3 may be smaller than the effective diameter of the fourth surface S4. The effective diameter of the third surface S4 may be larger than the effective diameter of the second surface S2 and may be smaller than the effective diameter of the first surface S1. The second lens 113 is made of plastic, and has a higher coefficient of thermal expansion than glass, which may cause greater thermal deformation. According to an embodiment of the invention, when there is a difference in the radius of curvature of the third surface S3 and the fourth surface S4 of the second lens 113, a relief structure may be provided on the outside of the second flange portion 113A to minimize the difference in curvature radii of the two surfaces S3 and S4 and thermal deformation due to the plastic material.

The third lens 115 is made of plastic and includes an object-side fifth surface S5 and a sensor-side sixth surface S6, and the fifth surface S5 and the sixth surface S6 may be aspherical. The fifth surface S5 may be convex on the optical axis Lz, and the sixth surface S6 may be concave on the optical axis Lz. As another example, the third lens 115 has two surfaces with different radii of curvature expressed in absolute values, and for example, may include any one of structures in which the fifth surface S5 is convex and the sixth surface S6 is concave, the fifth surface S5 may be convex and the sixth surface S6 may have a convex structure, or the fifth surface S5 may have a concave and the sixth surface S6 may have a concave. The third lens 115 may include a third flange portion 115A on the outside. A portion of the outer side of the third flange portion 115A may be in contact with the inner surface of the lens assembly 500 for heat dissipation. The third flange portion 115A extends from the outside of the effective diameter of the third lens 115 in the direction X perpendicular to the optical axis Lz, and a thickness of the third flange portion 115A may be a distance between two surfaces of the third flange portion 115A in contact with the optical member among the object-side and sensor-side regions.

The refractive index of the third lens 115 may be lower than that of the first lens 111, and may be less than 1.7, for example, in the range of 1.45 to 1.69. The materials of the second and third lenses 113 and 115 may be the same and may have the same refractive index. The difference in refractive index between the third lens 115 and the first lens 111 may be 0.3 or more. When expressed as an absolute value, the radius of curvature of the convex fifth surface S5 of the third lens 115 may be larger than the radius of curvature of the concave sixth surface S6, for example, 3 mm or more or in the range of 3 mm to 6.5 mm. The radius of curvature of the sixth surface S6 may be 4 mm or less in absolute value, for example, in the range of 1.5 mm to 4 mm.

The center thickness of the third lens 115 may be thinner than the center thickness of the first lens 111 and thinner than the center thickness of the second lens 113. The center distance between the third lens 115 and the second lens 113 may be greater than the center distance between the first and second lenses 111 and 113. The center distance between the third lens 115 and the optical filter 196 may be smaller than the center distance between the second and third lenses 113 and 115. Regarding the effective diameter of the third lens 115, the effective diameter of the fifth surface S5 may be smaller than the effective diameter of the sixth surface S6. The effective diameter of the sixth surface S6 may be larger than the effective diameter of the third surface S3 and may be larger than the effective diameter of the first surface S1. The third lens 115 is made of plastic, and has a higher coefficient of thermal expansion than glass, which may cause greater thermal deformation. In an embodiment of the invention, when there is a difference between the radius of curvature of the fifth surface S5 and the sixth surface S6 of the third lens 115, a relief structure may be provided on the outside of the third flange portion 115A to minimize the difference in curvature radii of the two surfaces S5 and S6 and thermal deformation due to the plastic material.

As shown in FIGS. 1 and 2, the lens assembly 500 may include a barrel upper portion 550 and a barrel portion 510. The barrel upper portion 550 and the barrel portion 510 may be formed as one body. The outer diameter or maximum diameter of the barrel upper portion 550 may be larger than the outer diameter or maximum diameter of the barrel portion 510. The barrel portion 510 may be a lens barrel or a lens holder. The barrel upper portion 550 has an open region 551 inside that is larger than a diameter of an opening 101. The open region 551 is open at the top and a plurality of ribs 555 may be extended from the center of the optical axis toward the outer circumferential surface. The diameter of the open region 551 may be larger than the diameter of the opening 101. The barrel upper portion 550 has a bottom portion 553 and a sidewall portion 554, and the ribs 555 may be connected to the bottom portion 553 and the sidewall portion 554. The barrel portion 510 may extend along the outer peripheral surface of the opening 101 through the bottom portion 553. The barrel portion 510 of the lens assembly 550 may have different outer diameters in a structure or shape, and thus may be effectively suppressed even if thermal deformation is generated by the lenses 111, 113, and 115 therein. Three or more ribs 555 may be spaced apart from each other and may support the barrel upper portion 550. The plurality of ribs 555 may be arranged in a radial direction from the optical axis. Each of the plurality of ribs 555 protrudes from the bottom 553 of the open region 551 in the optical axis direction and may have the same height and thickness. The thickness of the rib 555 may be the width in the circumferential direction. Each of the ribs 555 may have different lengths extending outward from the optical axis. For example, the upper length of each rib 555 may be greater than the lower length. The lower length may extend from the upper outer side of the opening 101 to the sidewall portion 555 of the barrel upper portion 550, which is an outer cover of the open region 551, and the upper length may be disposed in the same plane as the upper surface of the upper barrel 550 and may extend in the optical axis direction. The peripheral surface of the opening 101 may be inclined, and the outer surface of the barrel upper portion 550 may extend vertically.

The barrel upper portion 550 may be coupled to another transfer device, and a decrease in rigidity can be inhibited by the ribs 555. One surface of the barrel upper portion 550 is provided with a flat surface 559, which may be fixed in position or used as a bottom surface. The barrel portion 510 has at least two or three lenses disclosed above therein, and may include, for example, first to third lenses 111, 113, and 115. The barrel portion 510 may include a support body including a first outer diameter outside the first lens 111, a second outer diameter outside the second lens 113, and a third outer diameter outside the third lens 115. The sizes of the outer diameters may have a relationship of first outer diameter<second outer diameter<third outer diameter. The barrel portion 510 may have a certain thickness on the outside of each lens 111, 113, and 115, and the thickness is a straight distance from the inner surface of the contact side of each lens 111, 113, and 115 to the outer surface. Here, when the inner diameter of the barrel portion 510 is divided into an inner first inner diameter of the first outer diameter, an inner second inner diameter of the second outer diameter, and an inner third inner diameter of the third outer diameter, the relationship between the first inner diameter<the second inner diameter<the third inner diameter may be satisfied.

Lens data of the first to third lenses 111 to 115 according to an embodiment of the invention are shown in Table 1.

TABLE 1

| Lens | Surface | radius of curvature (mm) | Thickness (mm)/ Distance (mm) | Refractive index | Effective diameter (mm) |
|---|---|---|---|---|---|
| Lens 1 | S1 | 2.842 | 1.478 | 2.013 | 2.788 |
| | S2 (Stop) | 4.145 | 0.673 | | 1.46 |
| Lens 2 | S3 | −8.27 | 1.052 | 1.632 | 1.993 |
| | S4 | −3.83 | 0.375 | | 2.7 |
| Lens 3 | S5 | 1.748 | 0.591 | 1.632 | 3.186 |

TABLE 1-continued

| Lens | Surface | radius of curvature (mm) | Thickness (mm)/ Distance (mm) | Refractive index | Effective diameter (mm) |
|---|---|---|---|---|---|
| | S6 | 1.56 | 0.279 | | 3.94 |
| Optical filter | S7 | 1.00E+18 | 0.3 | 1.513 | 4.169 |
| | S8 | 1.00E+18 | 0.5 | | 4.275 |
| Cover glass | S9 | 1.00E+18 | 0.4 | 1.513 | 4.548 |
| | S10 | 1.00E+18 | 0.045 | | 4.689 |
| Image sensor | | 1.00E+18 | 0 | | 4.529 |

In Table 1, a distance between the first lens 111 and the second lens 113 in the optical axis may be larger than a distance (mm) between the second lens 113 and the third lens 115. The third lens 115 may have an inflection point on at least one or both of the object-side fifth surface S5 and the sensor-side sixth surface S6. For example, a position of a inflection point of the sixth surface S6 may be located further away from the optical axis than a position of the inflection point of the fifth surface S5, and is in the range of 50% to 80% of the distance from the optical axis to the end of the effective diameter. The seventh surface S7 may be an object-side surface of the optical filter, the eighth surface S8 may be a sensor-side surface, the ninth surface S9 may be an object-side surface of the cover glass, and the tenth surface S1 may be a sensor-side surface. The size of the image sensor is a length in the horizontal or vertical direction, and a length in the diagonal direction may be about 4.5 mm±0.5 mm.

In an embodiment of the invention, in order to alleviate thermal deformation of the second and third lenses 113 and 115, the lens assembly 500 may be made of a heat dissipating material or a metal material. The lens assembly 500 may have a top view shape of a circular pillar or a polygonal pillar shape. The lens assembly 500 may be made of resin, plastic, or metal. A hydrophilic material may be coated or applied to the surface of the lens assembly 500. Here, the lens assembly 500 may be selected from a metal material, such as Al, Ag, or Cu, and may be Al or Al alloy. When the lens assembly 500 is made of metal, heat transmitted in the lateral direction of the lenses 111, 113, and 115 can be dissipated and thermal deformation of the lenses 111, 113, and 115 can be suppressed.

At least a portion of the housing 600 may be coupled to the outer circumference of the lens assembly 500. The housing 600 protects the outside of the lens assembly 500 and the image sensor 192, blocks the inflow of foreign substances, and can be coupled to a moving object such as a vehicle. A portion of the housing 600 may be disposed between the outer circumference of the substrate 190 and the lower side of the barrel upper portion 550. The housing 600 may be adhered to the upper surface of the substrate 190, and may be adhered to the coupling surface of the lens assembly 500, that is, the outer lower surface of the barrel upper portion 550, with an adhesive member 650. The adhesive member 650 may be made of a resin material such as epoxy material or silicone material.

The first and second blocking films 121 and 124, the gap maintenance member 123, and the support member 125 may have openings therein, and may be adhered to the flange portions 111A, 113A, and 115A and the inner surface of the lens assembly 500 with the adhesive. The first and second light blocking films 121 and 124, the gap maintenance member 123, and the support member 125 may include a polyethylene film (PE film) or a polyester (PET)-based film.

As another example, the first and second light blocking films 121 and 124, the gap maintenance member 123, or the support member 125 may be made of metal or alloy and an oxide film may be formed on their surfaces. Material included in the metal or alloy may include at least one of In, Ga, Zn, Sn, Al, Ca, Sr, Ba, W, U, Ni, Cu, Hg, Pb, Bi, Si, Ta, H, Fe, Co, Cr, Mn, Be, B, Mg, Nb, Mo, Cd, Sn, Zr, Sc, Ti, V, Eu, Gd, Er, Lu, Yb, Ru, Y and La. The oxide film may be an oxidized material treated with black oxide or brown oxide using copper.

The image sensor 192 may be disposed on the substrate 190. The image sensor 192 may be mounted, seated, contacted, fixed, temporarily fixed, supported, or coupled to the substrate 190 on a plane intersecting the optical axis Lz. Alternatively, according to another embodiment, a groove or hole (not shown) capable of accommodating the image sensor 192 may be formed in the substrate 190, and the embodiment is not limited to a specific form in which the image sensor 192 is disposed on the main substrate 180. The substrate 190 may be a rigid PCB or FPCB. The image sensor 192 may perform a function of converting light passing through the lens portion 100 into image data. A sensor holder is disposed at the lower portion of the housing 500 to surround the image sensor 192 and protect the image sensor 192 from external foreign substances or impacts. The image sensor 192 may be one of a charge coupled device (CCD), complementary metal-oxide semiconductor (CMOS), CPD, or CID. When there are multiple image sensors 192, one may be a color (RGB) sensor and the other may be a black-and-white sensor.

The optical filter 196 may be disposed between the lens portion 100 and the image sensor 192. The optical filter 196 may filter light corresponding to a specific wavelength range for light passing through the lenses 111, 113, 115, and 117. The optical filter 196 may be an infrared (IR) blocking filter that blocks infrared rays or an ultraviolet (UV) blocking filter that blocks ultraviolet rays, but the embodiment is not limited thereto. The optical filter 196 may be disposed on the image sensor 192. The cover glass 194 is disposed between the optical filter 196 and the image sensor 192, protects the upper portion of the image sensor 192, and can inhibit the reliability of the image sensor 192 from deteriorating.

The camera module 1000 according to an embodiment of the invention may include a driving member (not shown), and the driving member may move or tilt a barrel having at least one of the lenses in an optical axis direction or/and a direction orthogonal to the optical axis direction. The camera module may include an auto focus (AF) function or/and an optical Image stabilizer (OIS) function. The camera module 1000 according to an embodiment of the invention may be applied to an infrared camera or a driver monitoring camera. Additionally, a field of view of the camera module 1000 may be 50 degrees or more, for example, in the range of 50 degrees to 90 degrees. Here, when the lens portion 100 is laminated by mixing plastic lenses and at least one glass lens, thermal deformation caused by the plastic lenses may be minimized at low temperatures of –20 degrees or less or at high temperatures of 80 degrees or more.

In an embodiment of the invention, the optical system may be designed as described above so that the change in focal length due to temperature change within the lens assembly 500 is minimized. Additionally, an embodiment of the invention may be designed so that the change in focal length is minimized through a coupling structure with the housing 600 in addition to the thermal compensation design of the lens assembly 500 of its own optical system. For example, the change in the optical axis distance (BFL: Back focusing length) between the image sensor 192 and the last lens can be minimized. Hereinafter, the mechanical heat compensation structure or heat compensation method will be described.

As shown in FIGS. 4-5 (B), the upper surface of the substrate 190 on the outside of the lens assembly 500 may be a reference surface S11, and an outer lower surface of the lens assembly 500 may be the coupling surface S12. That is, the adhesive member 650 is attached to the coupling surface S12, and the adhesive member 650 may be attached to the upper surface or a portion of the upper surface of the housing 600. The adhesive member 650 may be disposed between the housing 600 and the upper assembly portion 550. A portion disposed between the upper assembly portion 550 and the substrate 190 may be portion of or an inside of the housing 500. The reference surface S11 is the upper surface of the substrate 190 on which the image sensor 192 is mounted, and as another example, the reference surface S11 may be set as the image surface of the image sensor 192 because the image sensor 192 is thin. The coupling surface S12 is a surface where the lens assembly 500 and the housing 600 are coupled, and may be an upper surface of the adhesive member 650. As another example, it may be set to the lower surface of the adhesive member 650. A line extending horizontally to the reference surface S11 may be a first reference line K1, and a line extending horizontally to the coupling surface S12 may be a second reference line K2.

As shown in FIG. 5(A), when the external temperature rises, the housing 600 may expand toward the object or toward (i.e., the direction of the object) the adhesive member 650 based on the reference surface S11 or the first reference line K1, the lens assembly 500 expands the lower portion of the coupling surface S12 in a direction (i.e., the sensor direction) the substrate with respect to the coupling surface S12, and the upper portion of the coupling surface S12 may expand toward the object. As shown in FIG. 5(B), when the external temperature decreases, the housing 600 contracts in the direction of the substrate with respect to the reference surface S11, and the lens assembly 500, and the lens assembly 500 may contract the upper portion of the coupling surface S12 in the direction (i.e., the sensor direction) of the substrate, and the upper portion of the coupling surface S12 may contract toward (i.e., the direction of the object) the object side.

The performance of the lens within the camera module changes depending on the temperature, and if the focal length changes, the image cannot be formed in the focal plane, which can cause the image to become blurry. This change in focus may be caused by differences in the refractive index of the lens material depending on temperature, differences in contraction or expansion depending on the lens shape and lens thickness, and differences in contraction or expansion of the lens barrel or spacer. An embodiment of the invention may respond to a difference in contraction or expansion due to a configuration in a lens assembly with a heat compensation optical design, but may provide a structure of an optimal heat compensation in which the difference between high and low temperatures is minimized in BFL changes other than the heat compensation optical design.

The BFL value (unit mm) of the lens assembly 500 is determined by the optical design, and the change range of the BFL value in which performance is maintained according to the optical design may be obtained using Equations 1 and 2 below.

$$B = EFL \times 0.005 \qquad \text{[Equation 1]}$$

$$H2 \pm B = \text{allowable range of } BFL \qquad \text{[Equation 2]}$$

B is a change range of the BFL value, EFL is an effective focal length, and H2 is the BFL value defined by optical design. That is, the change range B of the BFL value may be set within 5% of the effective focal length (EFL). For example, when ELF is 4 mm, the amount of change in BFL may be about 0.02 mm, when EFL is 5 mm, the amount of change in BFL may be about 0.025 mm, when EFL is 8 mm, the amount of change in BFL may be in the range of 0.04 mm, and when EFL is 10 mm, the amount of change in BFL may be 0.05 mm. The BFL value appears slightly different depending on the optical design of the lenses in the lens assembly 500 or the temperature of low, room, or high temperatures, and the optical design may be designed so that the amount of change in the BFL is minimal. Additionally, embodiments of the invention may provide a mechanical coupling structure or method that maintains the BFL value at each temperature set by optical design. Here, the low temperature may be −20 degrees or less, the room temperature may be in the range of 20 to 30 degrees, and the high temperature may be in the range of 80 to 105 degrees. The BFL value may be considered a normal range when the temperature is greater than −20 degrees and less than 80 degrees.

Embodiment of the invention may set the coupling relationship between each component so that the BFL value remains within the initial design value range according to the position of the coupling surface S12. That is, the BFL value may be made similar to the optical design value depending on the setting position of the coupling surface S12. That is, the expansion direction of the lens assembly 500 and the expansion direction of the housing 600 may be compensated for so that the optical axis distance between the image sensor 192 and the last lens, that is, the BFL value, is within the optical design value range.

As shown in FIGS. 6 to 9, the first to third examples may be set, and each component H0, H1, H2, H3, and H4 may be defined as follows.

H0 is a height between the upper surface of the substrate 190 and the coupling surface, is the sum of other components, and may satisfy the following condition: H0=H1+H2+H3+H4. H0 may be the sum of the height of the housing 600 and the thickness of the adhesive member 650, and for example, may range from 1.5 mm to 8 mm. H1 is the height between the upper surface of the substrate 190 and the image surface (imaging plane) of the image sensor 192, and may be determined by the specifications of the image sensor or the manufacturer's specifications. Here, H1 may have a different coefficient of thermal expansion (CTE) depending on the material constituting the package of the image sensor 192. For example, the package may be made of glass, silicon, epoxy, solder ball, etc. H1 may be the thickness of the image sensor and may range from 0.2 mm to 0.3 mm. Since H0 is the height from the imaging surface of the image sensor, the height H1 or thickness of the image sensor 192 may satisfy the following condition: H0=H2+H3+H4, when there is little effect on the effect on the change in the BFL value. H2 is a BFL value that may be maintained at a value similar to the optical design value. At this time, the BFL value has a change amount within a certain range, and the coupling surface S12 may be set (the range of change in BFL value: B=TTL×0.01) to satisfy that range. The BFL value may be 1.5 mm or less, for example, in the range of 0.5 mm to 1.5 mm or in the range of 0.7 mm to 1.2 mm.

H3 is the height from the lower surface of the lens assembly 500 to the lower surface of the adhesive member 650, and may be contracted/expanded by the CTE of the lens assembly 500. However, the CTE of the lens assembly depending on the stacking structure of the lenses may be calculated by the CTE of the lens material (glass or plastic), the CTE of the light blocking film or gap maintaining member, the CTE of the light blocking filter, and the CTE value of the support member 125. The H3 may range from 0.2 mm to 6 mm, for example, may be smaller or larger than the H2. H4 is the thickness of the adhesive member 650, and may be determined by the mechanical structure or application amount of a region where the adhesive member 650 is applied, and may be in the range of 0.3 mm±0.1 mm. Here, the height of the barrel portion 510 may be defined as the sum (H3+H4) of the two heights.

In the invention, examples of heights H0, H1, H2, H3, and H4 according to the first to third examples may be set as shown in Table 2 below. Each height H0, H1, H2, H3, and H4 is an example of an optical design value (unit mm) at room temperature, and an error range may include ±5%.

TABLE 2

| Heights | Example 1 | Example 2 | Example 3 |
|---------|-----------|-----------|-----------|
| H0 | 6.265 | 3.86 | 1.96 |
| H1 | 0.265 | 0.265 | 0.265 |
| H2 | 0.895 | 0.895 | 0.895 |
| H3 | 4.805 | 2.4 | 0.5 |
| H4 | 0.3 | 0.3 | 0.3 |

In the first example of FIG. 6, it may be designed to have the relationship: H3>H2>H4>H1, and H0 may be 6 mm or more, for example, in the range of 6 mm to 8 mm. In the second example of FIG. 7, it may be designed to have the relationship: H3>H2>H4>H1, and H0 may be in the range of 3 mm to 5 mm. In the third example of FIG. 8, it may be designed to have the relationship: H2>H3>H4>H1, and H0 may be in the range of 1.5 mm to 3 mm. In this structure, when the EFL is 4 mm, the allowable range of BFL is 0.915 mm, which may be obtained as 0.02 mm (B)+0.895 mm (H2).

The thermal expansion coefficient of the lens assembly 500 may be defined as C1, the thermal expansion coefficient of the housing 600 may be C2, the thermal expansion coefficient of the adhesive member 650 may be C3, and the thermal expansion coefficient of the image sensor 192 may be C4. Here, the C4, that is, the CTE of the image sensor 192, may differ depending on the material that makes up the image sensor 192, and may be composed of two or more different materials. These CTEs may be expressed as Table 3.

TABLE 3

| Configuration | CTE |
|---------------|-----|
| Lens assembly | 0.000035 |
| Housing | 0.000023 |
| Adhesive member | 0.000046 |
| Image sensor | 0.000003 |

The thermal expansion coefficient of the lens assembly 500 may be greater than that of the housing and may be smaller than that of the adhesive member 650. That is, in the above configuration, the adhesive member 650 may have the largest thermal expansion coefficient and the image sensor 192 may have the smallest thermal expansion coefficient. The temperature change range AT in this camera module may be set to +Δ65 degrees (° C.) when rising or −65 degrees (° C.) when falling. In each example, the height H0 when the temperature rises may be set to H0up, and the height H0 when the temperature decreases may be set to H0dn.

The change range of each configuration in Table 2 according to the temperature increase of the camera module in the first example of FIG. 6 may be obtained as follows. Equation 3 below is the temperature changes H0up, H1up, H2up, H3up, and H4up of each configuration when the temperature rises, and Equation 4 is the temperature changes H0dn, H1dn, H2dn, H3dn, and H4dn of each configuration when the temperature falls. The temperature changes of the configuration during each temperature rise and fall may be considered by considering the CTE and temperature change range ΔT of each configuration in Table 2.

Change $(H0up)$ in housing =        [Equation 3]

$$(H0) + ((H1 + H2 + H3) \times C2 \times (+\Delta T) + (H4 \times C3 \times (+\Delta T)))$$

Change $(H3up + H4up)$ in lens portion =

$$(H3 + H4) + ((H3 + H4) \times C1 \times (+\Delta T))$$

Change $(H1up)$ in image sensor $= (H1) + (H1 \times C3 \times (+\Delta T))$ $BFL$ value $(H2up)$ at high temperature =

$$H0up - (\text{Change in Barrel}) - H1up$$

Change $(H0dn)$ in housing =        [Equation 4]

$$(H0) + ((H1 + H2 + H3) \times C2 \times (-\Delta T) + (H4 \times C3 \times (-\Delta T)))$$

Change $(H3dn + H4dn)$ in lens portion =

$$(H3 + H4) - ((H3 + H4) \times C1 \times (-\Delta T))$$

Change $(H1dn)$ in image sensor $= (H1) + (H1 \times C4 \times (-\Delta T))$ $BFL$ value $(H2dn)$ at low temperature =

$$H0dn - (\text{Change in Barrel}) - H1dn$$

Using Equation 3 and Equation 4, the values at high and low temperatures of each configuration may be obtained as shown in Table 4.

TABLE 4

| Configuration height (high temperature) | Value (mm) | Configuration height (low temperature) | Value (mm) |
|---|---|---|---|
| HOup | 3.866219 | HOdn | 6.255185 |
| H3up + H4up | 2.706143 | H3dn + H4dn | 5.093386 |
| H1up | 0.265052 | H1dn | 0.264948 |
| H2up | 0.895025 | H2dn | 0.896851 |

Here, according to the structure of the first example of FIG. 6 and Table 4, the amount of change in BFL may be calculated as −0.0037 mm due to the difference between the BFL value H2up at high temperature and the BFL value H2dn at low temperature.

Figure 7:
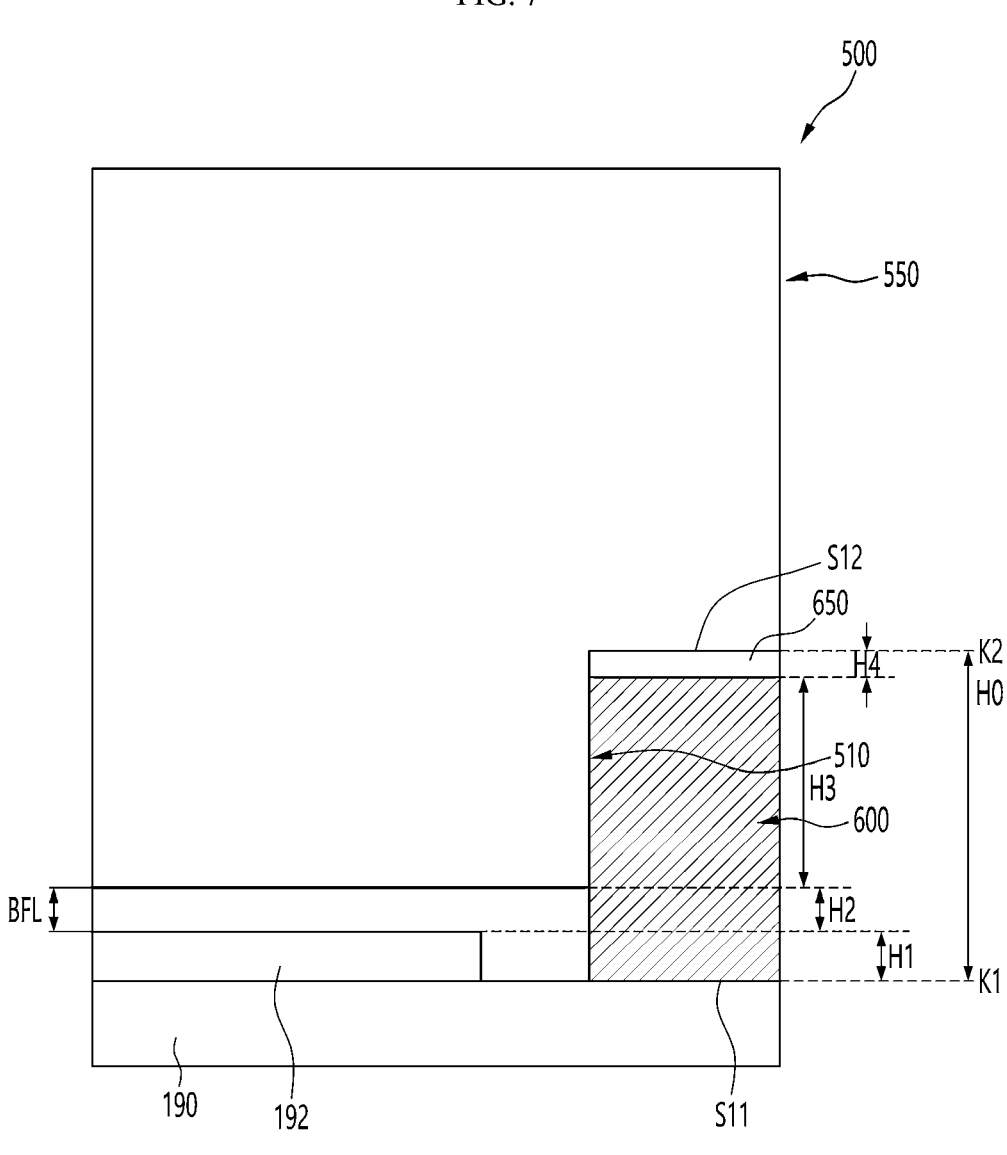
FIG. 7 is a diagram for explaining a camera module having a heat compensation structure as another example of FIG. 4.

Referring to the structure of the second example in FIG. 7, applying the values of each configuration in Table 2 and the thermal expansion coefficient of each component in Table 3 to Equations 3 and 4, the values of each configuration at high and low temperatures may be obtained as shown in Table 5.

TABLE 5

| Configuration height (high temperature) | Value (mm) | Configuration height (low temperature) | Value (mm) |
|---|---|---|---|
| HOup | 3.866219 | HOdn | 3.853781 |
| H3up + H4up | 2.706143 | H3dn + H4dn | 2.693858 |
| H1up | 0.265052 | H1dn | 0.264948 |
| H2up | 0.895025 | H2dn | 0.894975 |

Here, according to the structure of the second example of FIG. 7 and Table 5, the amount of change in BFL may be calculated as 5E-05 mm by the difference between the BFL value H2up at high temperature and the BFL value at low temperature H2dn.

Figure 8:
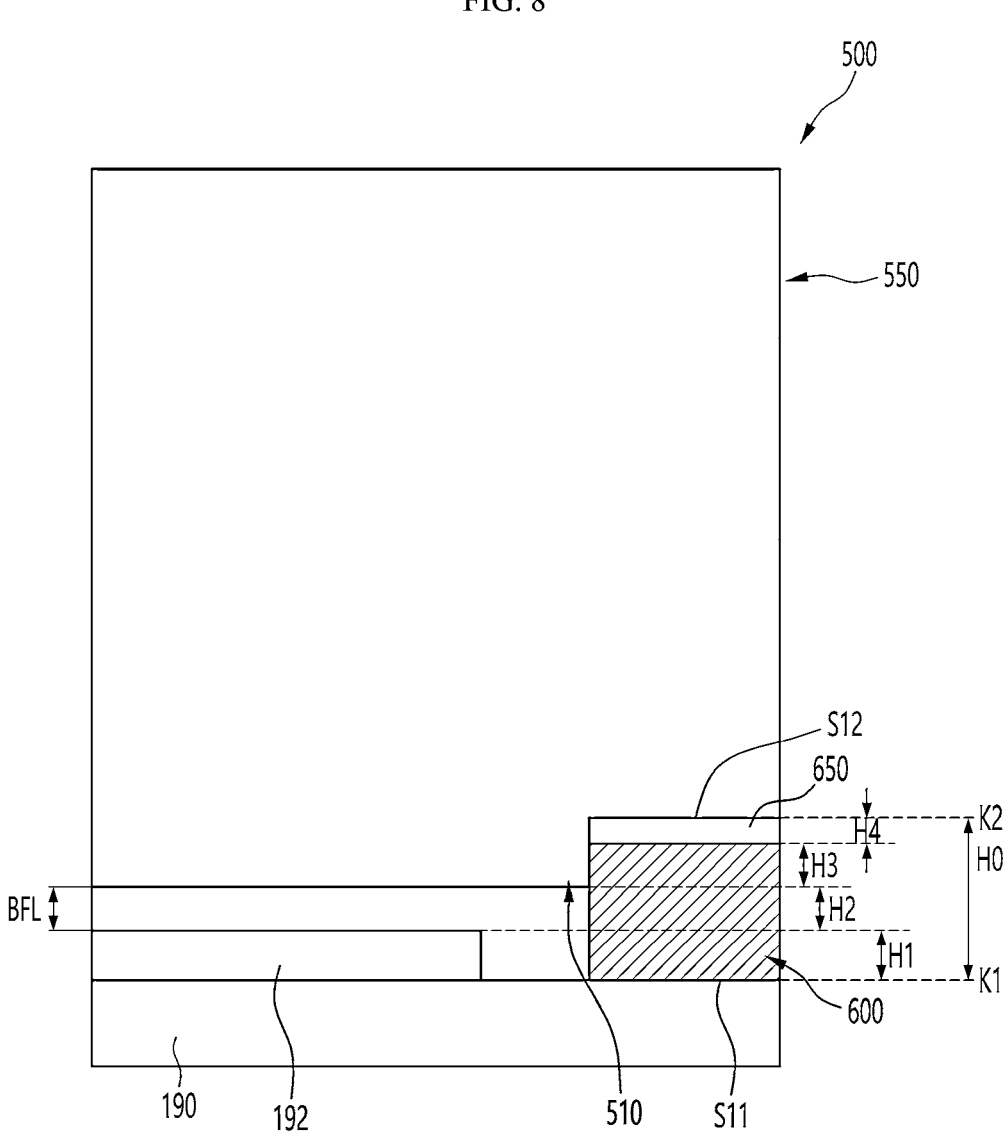
FIG. 8 is a diagram for explaining a camera module having a heat compensation structure as another example of FIG. 4.

Referring to the structure of the third example in FIG. 8, applying the values of each configuration in Table 2 and the thermal expansion coefficient of each component in Table 3 to Equations 3 and 4, the values of each component at high and low temperatures may be obtained as shown in Table 6.

TABLE 6

| Configuration height (high temperature) | Value (mm) | Configuration height (low temperature) | Value (mm) |
|---|---|---|---|
| HOup | 1.963379 | HOdn | 1.956621 |
| H3up + H4up | 0.80182 | H3dn + H4dn | 0.79818 |
| H1up | 0.265052 | H1dn | 0.264948 |
| H2up | 0.896507 | H2dn | 0.893493 |

Here, according to the structure of the third example of FIG. 8 and Table 6, the amount of change in BFL may be calculated as 0.003014 mm by the difference between the BFL value H2up at high temperature and the BFL value at low temperature H2dn.

From the first to third examples, the invention may be applied as a heat compensation structure when the difference between the BFL values at high temperature and low temperature is minimal or the same. In this case, since the value of the adhesive member, the height value of the image sensor, and the distance (BFL) between the image sensor and the last lens are almost unchanged, the BFL value may be kept the same or minimum change when optimizing the height H3, that is, a distance or a height between the lower surface of the lens assembly 500 or the lower surface of the lens barrel and the adhesive members 650. It may be seen that in the first to third examples of the invention, the structure with the smallest difference in BFL values at high and low temperatures is the structure of the second example. That is, the height of H3 is greater than BFL and is 3 mm or less, for example, when it is in the range of 2.4 mm±0.5 mm or 1.5 mm to 3 mm, it may be seen that the amount of change in BFL at high/low temperature is minimal.

Camera modules according to various embodiments may be applied to, for example, electronic devices employing image sensors. The camera module according to the exemplary embodiment can be applied to various electronic devices such as digital cameras, interchangeable lens cameras, video cameras, cell phone cameras, cameras for small mobile devices, VR, AR, drones, or unmanned aerial vehicles.

Figure 9:
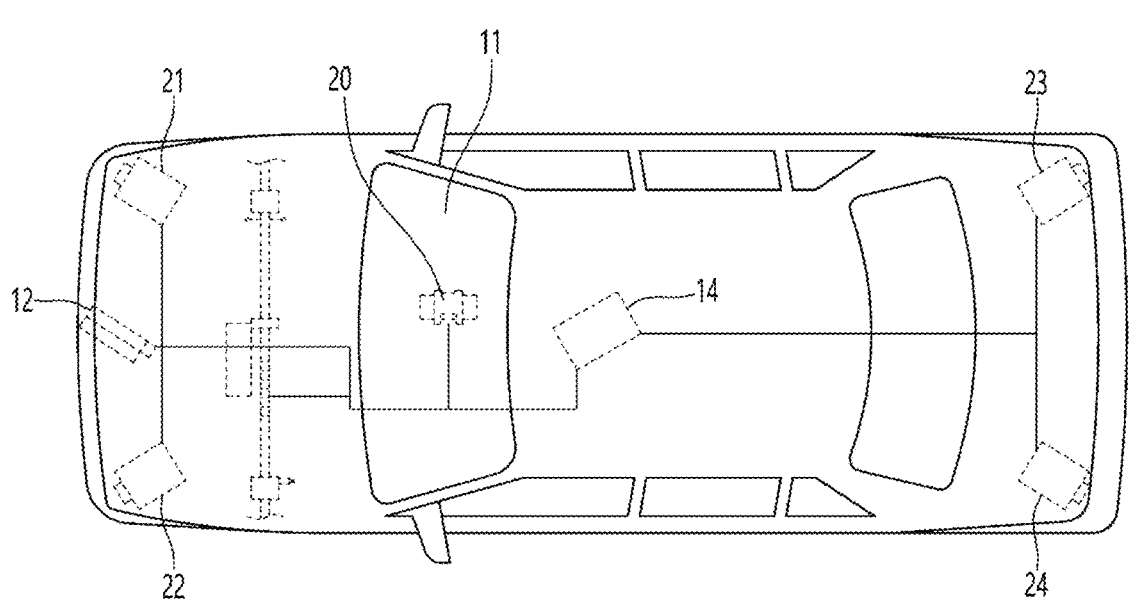
FIG. 9 is a plan view showing an example of a vehicle having a camera module according to an embodiment of the invention.

FIG. 9 is an example of a top view of a vehicle to which a camera module according to an embodiment of the invention is applied. Referring to FIG. 9, the vehicle camera system according to an embodiment of the invention includes an image generating unit 11, a first information generating unit 12, second information generating units 21, 22, 23, 24, and a control unit 14. The image generating unit 11 may include at least one camera module 20 disposed in the own vehicle, and may generate a front image of the own vehicle or an image inside the vehicle by photographing the front and/or driver of the own vehicle.

In addition, the image generating unit 11 may generate an image captured by the driver or the surroundings of the own vehicle in one or more directions as well as in front of the own vehicle by using the camera module 20. Here, the front image and the surrounding image may be a digital image, and may include a color image, a black-and-white image, and an infrared image. In addition, the front image and the surrounding image may include a still image and a moving image. The image generating unit 11 provides the driver image, the front image, and the surrounding image to the control unit 14. Next, the first information generating unit 12 may include at least one radar and/or a camera disposed on the own vehicle, and generates first sensing information by detecting the front of the own vehicle. Specifically, the first information generating unit 12 is disposed in the own vehicle, and generates the first sensing information by detecting the positions and speeds of vehicles located in front of the own vehicle, the presence and location of pedestrians, and the like. By using the first sensing information generated by the first information generating unit 12, it is possible to control to maintain a constant distance between the own vehicle and the vehicle in front, and the stability of vehicle operation may be improved in a preset specific case, such as when the driver wants to change the driving lane of the own vehicle or when reverse parking. The first information generating unit 12 provides the first sensing information to the control unit 14. The second information generating unit 21, 22, 23, 24 detect each side of the own vehicle and generate second sensing information based on the front image generated by the image generating unit 11 and the first sensing information generated by the first information generating unit 12. Specifically, the second information generating units 21, 22, 23, and 24 may include at least one radar and/or camera disposed on the own vehicle, and detect the positions and speeds of vehicles located on the side of the own vehicle, or may take a video. Here, the second information generating units 21, 22, 23, and 24 may be disposed on both sides of the front and rear of the own vehicle, respectively.

Such the vehicle camera system may include the following camera module, and may protect the vehicle and objects from automatic driving or surrounding safety by providing or processing information obtained through the front, rear, each side or corner region of the own vehicle to the user. A plurality of optical systems of the camera module according to an embodiment of the invention may be mounted in a vehicle for safety regulation, reinforcement of autonomous driving functions, and increased convenience. In addition, the optical system of the camera module is a part for control such as a lane keeping assistance system (LKAS), a lane departure warning system (LDWS), and a driver monitoring system (DMS), and is applied in a vehicle. Such a vehicle camera module may realize stable optical performance even when ambient temperature changes and provide a module with competitive price, thereby securing reliability of vehicle components.

According to an embodiment of the invention, a spacer with a buffer structure may be applied to the outside of at least one lens for temperature changes from a low temperature of −20 degrees or less to a high temperature of 70 degrees or more, e.g., −40 to 85 degrees or −40 to 105 degrees in a vehicle camera module, and thus, since it relieves in the longitudinal direction for a lens with a high thermal expansion coefficient, it provides elasticity that contracts or expands against the expansion of a lens made of plastic or glass, and may suppress the amount of change in the optical axis direction of the effective diameter area of the lens. Accordingly, it is possible to reduce the change in optical properties of the camera module employing a lens made of plastic or glass. In addition, a buffer structure may be further included in the outer flange portion of the lens, thereby suppressing elastic deformation of the lens itself.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. A camera module comprising:
a substrate;
an image sensor disposed on the substrate;
a lens assembly disposed on the image sensor and including a barrel portion having a plurality of lenses in a through hole;
an optical filter disposed between the image sensor and a last lens;
a housing disposed between an upper surface of the substrate and an outer circumference of the lens assembly; and
an adhesive member that adheres an upper surface of the housing to the outer circumference of the lens assembly,
wherein the image sensor, the lens assembly, the housing, and the adhesive member have different thermal expansion coefficients from each other,
wherein an optical axis distance between the image sensor and a lens closest to the image sensor among the lenses in the lens assembly is a BFL (back focusing length),
wherein a height from a lower surface of the lens assembly to a lower surface of the adhesive member is greater than the BFL and is 3 mm or less,
wherein the lens closest to the image sensor is made of plastic, and
wherein a first lens closest to an object among the plurality of lenses is made of glass.

2. The camera module of claim 1, wherein the adhesive member is made of epoxy material or a material with a higher thermal expansion coefficient than that of the lens assembly.

3. The camera module of claim 1, wherein a thickness of the adhesive member is in a range of 0.3 mm±5%.

4. The camera module of claim 1, wherein a height from an upper surface of the substrate to an upper surface of the adhesive member is in a range of 3 mm to 5 mm.

5. The camera module of any one of claim 1, wherein a change amount of the BFL is in a range of EFL×0.005 mm, wherein EFL is an effective focal length.

6. The camera module of claim 5, wherein an allowable range of the BFL is BFL value+BFL change amount.

7. The camera module of claim 5, wherein when a temperature change between high and low temperature of the camera module is in a range of ±65 degrees based on room temperature, wherein a difference of the temperature change of the BFL between the high and low temperatures is minimum, and a height from the lower surface of the lens assembly to the lower surface of the adhesive member is 2.4 mm±0.5 mm.

8. A vehicle having a camera module of claim 1.

9. A camera module comprising:

a substrate;

an image sensor disposed on the substrate;

a lens portion disposed on the image sensor and having five or less lenses aligned along an optical axis;

a lens assembly in which the lenses are disposed;

an optical filter disposed between the image sensor and a last lens closest to the image sensor; a housing disposed between an upper surface of the substrate and an outer circumference of the lens assembly; and an adhesive member disposed between the housing and the outer circumference of the lens assembly, wherein the image sensor, the lens assembly, the housing, and the adhesive member have different thermal expansion coefficients from each other, wherein an optical axis distance between the image sensor and the lens closest to the image sensor among the lenses in the lens assembly is a BFL (back focusing length), wherein a height from a lower surface of the lens assembly to a lower surface of the adhesive member is greater than the BFL and is 3 mm or less, wherein the five or less lenses include at least one glass lens and a plurality of plastic lenses, and wherein there are more lenses made of plastic than of glass.

10. The camera module of claim 9, comprising a cover glass disposed between the optical filter and the image sensor.

11. The camera module of claim 9, wherein the lens assembly includes a barrel portion to which the lenses are coupled to a barrel upper portion and an inner portion, wherein the barrel upper portion and the barrel portion have an opening therein, and wherein the barrel upper portion of the barrel is disposed on the upper portion of the barrel portion.

12. The camera module of claim 11, wherein an inner portion of the barrel upper portion includes an open region having a diameter larger than a diameter of the open region of the barrel portion.

13. The camera module of claim 11, wherein the barrel upper portion includes an open region with an open upper portion, a bottom portion extending outward from an upper end of the barrel portion, and a sidewall portion extending vertically from the bottom portion towards an object.

14. The camera module of claim 9, wherein the adhesive member is made of epoxy material or a material whose thermal expansion coefficient is higher than that of the lens assembly.

15. The camera module of claim 9, wherein a thickness of the adhesive member is in a range of 0.3 mm±5%.

16. The camera module of claim 9, wherein a sum of a thickness of the housing and a thickness of the adhesive member is in a range of 3 mm to 5 mm.

17. The camera module of claim 9, wherein a change amount of the BFL is in a range of EFL×0.005 mm, wherein the lens portion includes first to third lenses arranged along the optical axis from an object toward the image sensor, and wherein the EFL is an effective focal length.

18. The camera module of claim 17, wherein the first lens is made of glass, wherein the second lens and the third lens are made of plastic, wherein an allowable range of the BFL is a value of BFL value±BFL change amount.

19. The camera module of claim 18, wherein a height from the lower surface of the lens assembly to the lower surface of the adhesive member is 2.4 mm±0.5 mm.

20. The camera module of claim 9, wherein the optical filter is disposed within the lens assembly.

\*   \*   \*   \*   \*